United States Patent [19]

Blander et al.

[11] Patent Number: 4,475,993

[45] Date of Patent: Oct. 9, 1984

[54] EXTRACTION OF TRACE METALS FROM FLY ASH

[75] Inventors: Milton Blander, Palos Park, Ill.; Chien M. Wai, Moscow, Id.; Zoltan Nagy, Woodridge, Ill.

[73] Assignee: The United States of America as represented by the United States Department of Energy, Washington, D.C.

[21] Appl. No.: 523,492

[22] Filed: Aug. 15, 1983

[51] Int. Cl.$^3$ ............... C25C 1/06; C25C 1/12; C25C 1/16; C25C 1/18
[52] U.S. Cl. ............... 204/64 T; 204/64 R; 204/66; 204/71; 75/25; 75/28; 75/62; 75/63; 75/66; 75/71; 75/72; 75/77; 75/78; 75/80; 75/83
[58] Field of Search ............... 75/25, 62, 63, 71–72, 75/83, 77, 78, 80, 86, 28; 204/64 R, 64 T, 66, 71

[56] References Cited

U.S. PATENT DOCUMENTS 3,291,597 12/1966 Mellgren et al. .................. 75/83
3,802,870 4/1974 Bell .................................. 75/63

*Primary Examiner*—R. L. Andrews
*Attorney, Agent, or Firm*—William Lohff; James W. Weinberger; Michael F. Esposito

[57] ABSTRACT

A process for recovering silver, gallium and/or other trace metals from a fine grained industrial fly ash associated with a process for producing phosphorous, the fly ash having a silicate base and containing surface deposits of the trace metals as oxides, chlorides or the like, with the process being carried out by contacting the fly ash with $AlCl_3$ in an alkali halide melt to react the trace metals with the $AlCl_3$ to form compositions soluble in the melt and a residue containing the silicate and aluminum oxide or other aluminum precipitate, and separating the desired trace metal or metals from the melt by electrolysis or other separation techniques.

7 Claims, No Drawings

EXTRACTION OF TRACE METALS FROM FLY ASH

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates to the treatment of industrial fly ash and more particularly to the treatment of fly ash to recover valuable trace metals such as gallium, silver, and the like.

In many industrial processes, fly ash is produced in the chimneys or stacks where electrostatic precipitators or other recovery equipment is used to remove particulates. In general, the fly ash is composed of fine grained particles having a silicate base with small amounts of trace metals on the surfaces of the particles. Two fly ashes produced in quantity are phosphate fly ash associated with the production of elemental phosphorous and coal fly ash associated with the combustion of coal.

For phosphate fly ash, the following reaction may illustrate the formation of a silicate base $$4Ca_3F(PO_4)_3 + 18SiO_2 + 30C \rightarrow 18CaSiO_3 \cdot 1/9CaF_2 + 30CO\uparrow + 3P_4\uparrow$$

Frequently fly ash contains metals such as gallium, silver, cadmium, manganese, lead, titanium and the like in trace amounts totalling less than about 1 wt. %. Recovery of one or more of these metals is important since the metals are either in limited supply within the United States, are expensive or may be objectional in the fly ash. With respect to gallium which is a strategic metal, it has been estimated that about 60% of gallium is imported. Other metals such as silver are relatively expensive and have many industrial uses. Still other metals such as cadmium may be objectional in the fly ash if it is used for ground fill or other environmental purposes.

Processes have been developed for recovery of some of these metals. As disclosed in German Offen. 2,407,948 associated with U.S. application Ser. No. 333,928, gallium is concentrated by contacting the fly ash with $Ca(OH)_2$ and removing the precipitate to provide a gallium containing solution. Carbon dioxide or hydrogen sulfide is then used to form a gallium containing precipitate. In Belgium 853,608 associated with Canadian application No. 250,752, the fly ash is heated with concentrated $H_2SO_4$ to provide a solution containing gallium and zinc. The solution is treated with $(NH_4)_2SO_4$ to precipitate $ZnSO_4$ which is removed by filtration with the filtrate being treated with NaOH to precipitate gallium. While these processes may have value, they include several treatment and recovery stages and therefore have some complexities and expense.

Accordingly, one object of this invention is a process for the recovery of one or more trace metals from industrial fly ash. Another object of the invention is the recovery of gallium from industrial fly ash and particularly phosphate fly ash. An additional object of the invention is the removal of one or more trace metals from fly ash to provide a more acceptable product with respect to environmental uses. These and other objects of the invention will become apparent from the following detailed description.

SUMMARY OF THE INVENTION

Briefly, the invention relates to a process for recovering one or more trace metals from a fine grained, fly ash having a silicate base and containing surface deposits of the trace metals, by contacting the fly ash with $AlCl_3$ in an alkali halide melt to react the trace metals with the $AlCl_3$ to form compositions soluble in the melt and a residue containing the silicate and aluminum oxide formed in the reaction. Trace metals recovered in this process are identified by negative free energies for the reaction forming aluminum oxide. In general, these trace metals are in the form of oxides in the fly ash and are converted to chlorides in the reaction.

Advantageously, the process includes the step of separating one or more trace metals from the melt by volatilization, electrolysis, precipitation and the like. Preferably, reduction of the trace metal or metals is carried out by electrolysis to provide the elemental metal or metals.

DETAILED DESCRIPTION OF THE PREFERRED EMBODIMENT

In the inventive process, the fly ash containing trace metals in a concentration of less than about 1 wt. % as primarily surface deposits is contacted with $AlCl_3$ in an alkali halide metal for a time sufficient to dissolve most of the trace metals in the melt. The fly ash of particular importance is phosphate fly ash or coal fly ash containing a plurality of trace metals which may be in limited supply in the United States, expensive, and/or objectionable in the fly ash because of environmental reasons. Preferably, the fly ash contains several metals within the group including gallium, silver, cadmium, lead, iron, mercury, titanium, and the like. The fly ash is further characterized by having a silicate base and usually contains at least about 50 wt. % and more commonly about 70 wt. % of one or more silicates.

The trace metals which are more easily removable are those forming surface deposits on the particles of the fly ash. In general, the oxides or chlorides of these metals are volatile at temperatures in the range of 200°–1200° C. In the processes producing the fly ash, these metallic compositions are generally present as a vapor and at the lower stack temperatures tend to solidify as ultrafine grains on the surfaces of the particles. Typically, the deposits may be in the order of submicrons and are formed on particles which are in the order of microns. With some metals such as CR and V, their oxides or chlorides are less volatile and may tend to solidify at higher temperatures during the formation or enlargement of the particles of the fly ash. Therefore, their deposits may be below the surfaces of the particles and more difficult to remove.

The fly ash is contacted with $AlCl_3$ in an alkali halide metal at temperatures of about 300°–1000° C., advantageously about 400°–800° C. and preferably about 400°–600° C. for a time sufficient to dissolve a major portion of the trace metals which form soluble compositions by reaction with $AlCl_3$ to form $Al_2O_3$.

Suitably, the $AlCl_3$ is present in an amount in excess of that required to form $Al_2O_3$ and preferably about 40°–100° % in excess. This excess increases the solubility of $Al_2O_3$ considerably (e.g., to about 10-5 mole fraction in LiCl-KCl eutectic) and helps to increase the rate of reaction. The alkali halide melt contains one or more alkali halides and preferably the fluorides and chlorides alone or in combination. The alkali metal may be lithium, potassium, and sodium and/or is preferably a halide combination such as LiCl and KCl forming an eutectic or a melt at a low temperature. The time of reaction is sufficient to convert a major portion of the trace metals on the surface deposits to soluble form and in general is in the range of about 1-6 hrs. Excessive time should be avoided since the silicate base may be attacked.

Following the reaction and solubilizing of the trace metals, the silicate residue or remainder including the reaction product $Al_2O_3$ is separated by filtration or the like. With the phosphate fly ash, the residue may contain some phosphate content to cause it to be useful as a fertilizer.

The halide melt then may be treated by one or more process steps to recover one or more trace metals. These may include volatilizing off trace metal compositions, separation of the trace metals by electrolysis or precipitating trace metal compositions. Preferably electrolysis is used to produce one or more trace metals sequentially. For example, in the LiCl-KCl eutectic, the electromotive force series relative to platinum for a number of elements of interest is as follows (based on mole fraction scale).

|  | e.m.f. |
|---|---|
| Mn(II)/Mn(0) | −1.849 |
| Ti(II)/Ti(0) | −1.74 |
| Ti(iii)/Ti(0) | −1.64 |
| Zn(ii)/Zn(0) | −1.566 |
| V(II)/V(0) | −1.533 |
| Tl(I)/Tl(0) | −1.359 |
| Cd(II)/Cd(0) | −1.316 |
| Fe(II)/Fe(0) | −1.172 |
| Ga(III)/Ga(0) | −1.171 |
| Pb(II)/Pb(0) | −1.101 |
| Sn(II)/Sn(0) | −1.082 |
| Ni(II)/Ni(0) | −0.795 |
| Cu(II)/Cu(0) | −0.851 |
| Ag(I)/Ag(0) | −0.637 |
| Hg(II)/Hg(0) | −0.622 |

To illustrate, with a mixture of $Ag^+$, $Ga^{+3}$ and $Zn^{+2}$ in the LiCl-KCl eutectic mixture, the differences in decomposition potentials in the table above are large enough to achieve an effective separation by sequential deposition.

The following examples are provided for illustrative purposes and are not intended to be restrictive as to the scope of the invention:

Example I

A 2 g. sample of fly ash containing trace metals listed in Table I below was added to a 20 g. sample of LiCl-KCl eutectic melt at 450° C. with $AlCl_3$ present in an amount of about one mole %. After a reaction time of about 3 hrs. with no stirring, the ash residue was analyzed for the trace metals with the results being listed Table I. As revealed by the results, about 98% wt. Ag, 82% Cu, 84% Fe, 98% Cd, 69% Ga, 97% Mn, 94% Pb, 84% Ti and 99% Zn were separated from the original ash. Cr and V were not significantly removed in the process.

The above results demonstrate that a major portion and in general most of Ag, Cu, Fe, Cd, Ga, Mn, Pb, Ti and Zn was removed from the fly ash by treatment with $AlCl_3$.

TABLE 1

Concentrations of Trace Metals in a Phosphate Fly Ash Before and After Reaction With $AlCl_3$ in LiCl—KCl Eutectic Melts at 450° C.

| Metal | Conc. in Ash Original | $AlCl_3$ Treated | % Removal |
|---|---|---|---|
| Ag | 597 ppm | 13 ppm | 98 |
| Cr | 132 ppm | 133 ppm | 0 |
| Cu | 147 ppm | 26 ppm | 82 |
| Fe | 2287 ppm | 365 ppm | 84 |
| Cd | 210 ppm | 4 ppm | 98 |
| Ga | 294 ppm | 92 ppm | 69 |
| Mn | 189 ppm | 6 ppm | 97 |
| P | 13% | 14.6% | 0 |
| Pb | 1334 ppm | 85 ppm | 94 |
| Ti | 112 ppm | 18 ppm | 84 |
| V | 158 ppm | 207 ppm | 0 |
| Zn | 9.9% | 406 ppm | 99 |

EXAMPLE II

The melt of Example I at about 450° C. is used to separate some metallic compositions electrolytically. The electrolytic cell includes the melt and electrodes of graphite or other inert materials. A voltage is applied and slowly increased until Ag and Cu are deposited at the cathode and removed. As the melt becomes depleted of these metals, the voltage is increased until a mixture of Pb, Ga and Fe is deposited at the cathode. The next group of metals which are deposited are Cd and Zn followed by Ti and Mn. Gallium is removed from the mixture of Pb, Ga and Fe by chlorination of the metals followed by separation of $GaCl_3$.

The foregoing description of embodiments of the invention has been presented for purposes of illustration and description. It is not intended to be exhaustive or to limit the invention to the precise form disclosed. Other modifications and variations are possible in light of the above teaching.

We claim:

1. A process for recovering one or more trace metals from a fine grained fly ash having a silicate base and a surface with deposits of the trace metals in a concentration less than about 1 wt. %, the trace metal being selected from the group consisting of Ag, Cu, Fe, Cd, Ga, Mn, Pb, Ti, Zn and mixtures thereof, comprising the steps of
   contacting the fly ash with $AlCl_3$ in an alkali halide melt for a time sufficient for the $AlCl_3$ and trace metals to react and form trace metal compositions soluble in the melt and a silicate based residue, and separating the residue from the melt.

2. The process of claim 1 wherein the contacting step is carried out at a temperature in the range of about 300°–1000° C.

3. The process of claim 1 including the step of separating one or more of the trace metals from the melt.

4. The process of claim 3 wherein the separation step is carried out by electrolysis to produce one or more of the trace metals.

5. The process of claim 4 wherein said trace metals include gallium.

6. The process of claim 4 wherein said trace metals include silver.

7. The process of claim 4 wherein said trace metals include cadmium.

* * * * *